April 23, 1946. H. S. HOFFAR 2,398,789
ANTIFRICTION SCREW DEVICE
Filed May 3, 1943 2 Sheets-Sheet 1

INVENTOR
Henry S. Hoffar
BY
ATTORNEY

April 23, 1946.   H. S. HOFFAR   2,398,789
ANTIFRICTION SCREW DEVICE
Filed May 3, 1943   2 Sheets-Sheet 2

INVENTOR
Henry S. Hoffar
BY
ATTORNEY

Patented Apr. 23, 1946

2,398,789

UNITED STATES PATENT OFFICE 2,398,789

ANTIFRICTION SCREW DEVICE

Henry S. Hoffar, West Vancouver, British Columbia, Canada, assignor, by mesne assignments, to The Cleveland Pneumatic Tool Company, Cleveland, Ohio, a corporation of Ohio Application May 3, 1943, Serial No. 485,423

2 Claims. (Cl. 74—459)

The present invention relates to anti-friction screw devices and more particularly to improvements in such devices as illustrated in my Patent Number 2,298,011, granted October 6, 1942.

Anti-friction screw devices of the type disclosed in my patent which employ circulating balls for interconnecting the nut and screw have heretofore been so constructed that the screw member is longer than the nut member and the balls have been made to circulate through the nut by way of a by-pass formed therein.

In accordance with the present invention, the construction is such that the nut is the longer member and the screw is the shorter member with the balls being circulated through the screw rather than through the nut, suitable deflecting means and by-pass being provided in the screw. From this construction, it will be readily apparent that it is possible to enclose the grooved members entirely and thus retain any lubricant employed while excluding dirt, dust and other foreign matter.

The primary object of the invention is, therefore, to provide an anti-friction screw device of the recirculating ball type, the construction of which makes it possible to enclose completely certain of the moving parts to thus effectively lubricate said parts while substantially excluding dirt, dust and other foreign matter therefrom.

Another object of the invention resides in the provision of means whereby anti-friction screw and nut devices of the recirculating ball type may be improved in construction and operation.

Other objects and advantages more or less ancillary to the foregoing reside in the specific construction and aggroupment of the elements peculiar to this structure, as will become apparent from a more complete examination of this specification.

In the drawings which illustrate the invention:

Figure 1:
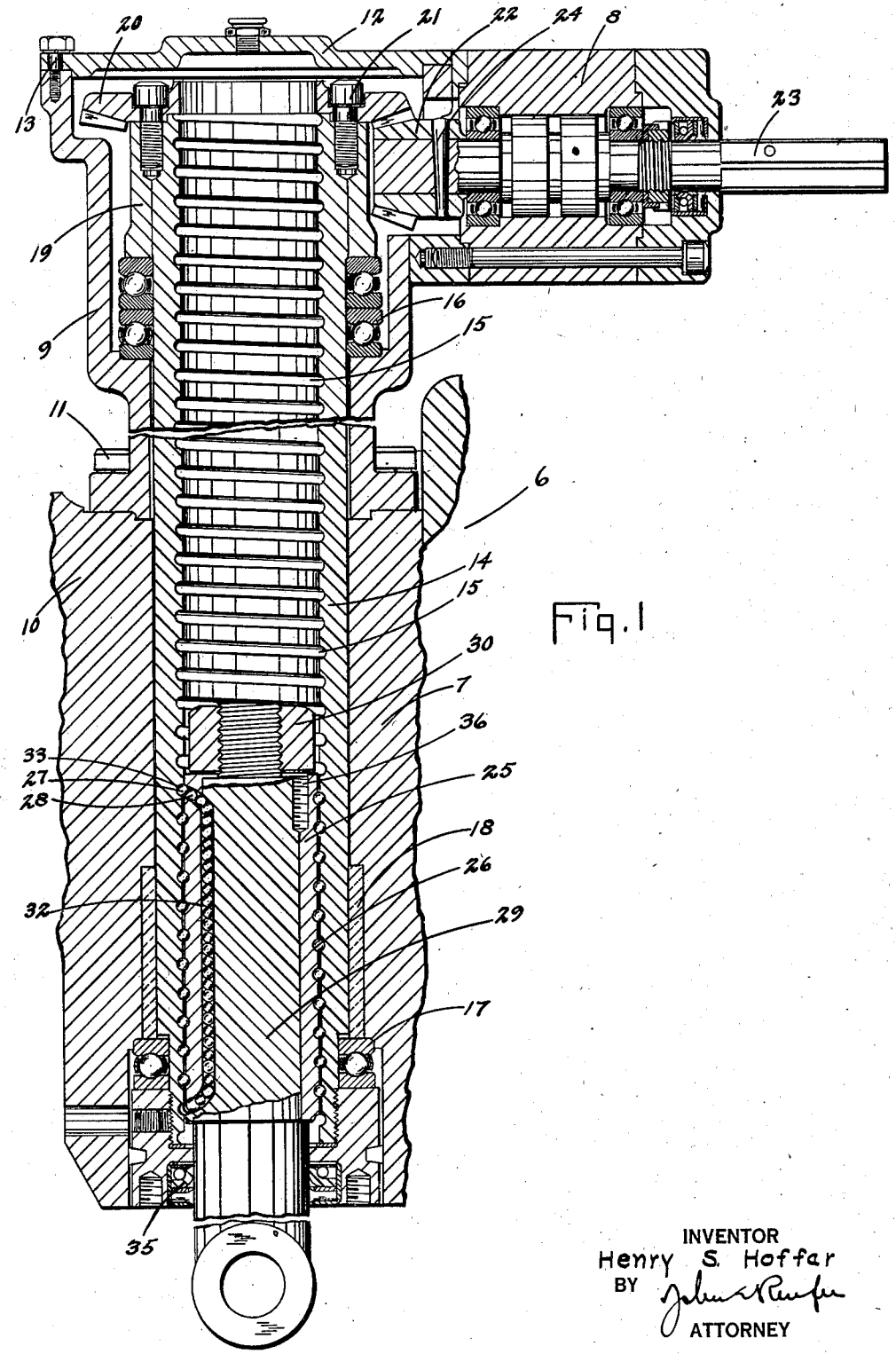
Fig. 1 is an enlarged longitudinal sectional view illustrating an anti-friction screw device constructed in accordance with the present invention in use with a lifting jack.

Referring to the drawings for a more detailed description thereof, and particularly Fig. 1 wherein there is disclosed a practical application of the invention, a lifting jack of the screw type is generally designated by the reference numeral 6, and includes a housing 7 and rotating mechanism 8 attached thereto and extending at right angles therefrom. In the illustration shown, the housing 7 is formed of upper and lower sections 9 and 10 united by means of bolts or the like 11, while the upper section 9 is provided with a cap 12 which is detachably connected thereto by machine screws 13.

The housing 7 rotatably supports the relatively long member 14, hereinafter termed the nut, said nut being formed with helically inclined grooves 15 throughout its length and said grooves being slightly less than semi-circular in cross section. The nut 14 is supported in the housing 7 on bearings 16 and 17, a packing sleeve 18 surrounding the lower end of the nut 14 and in engagement with the lower bearing 17.

The jack 6 further includes a sleeve 19 on the upper end of the nut 14, which sleeve rests upon the upper bearings 16. The mechanism for rotating the nut 14 includes a beveled gear 20 keyed to the sleeve 19 and upper end of the nut 14 by means of the screws 21, said gear 20 being in mesh with a pinion gear 22 carried on the inner end of the operating shaft 23 and secured thereto by means of a pin or the like 24. Since the gears and their associated mechanism form no part of the present invention, it is not deemed necessary to completely describe their construction and operation. It is to be understood, however, that the jack mechanism is raised and lowered by rotation of the shaft 23 to drivingly engage the gears 20 and 22. As the gear 20 is rotated, the construction whereby it is keyed to the sleeve 19 and upper end of the nut 14 will rotate those parts to raise and lower the shaft 29 carried thereby.

Figure 3:
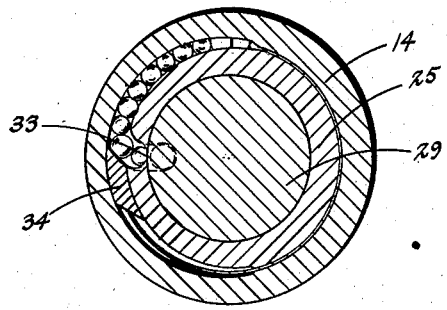
Fig. 3 is a vertical sectional view taken substantially on line 3—3 of Fig. 2.
Figure 2:
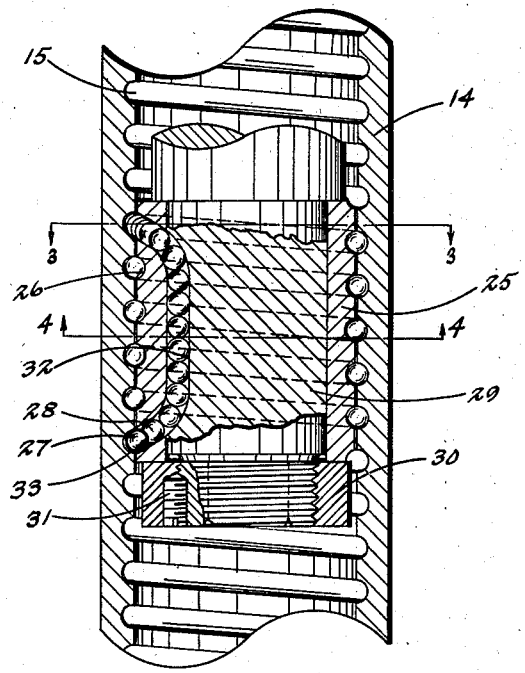
Fig. 2 is a fragmentary sectional view of the mechanism removed from the jack.
Figure 4:
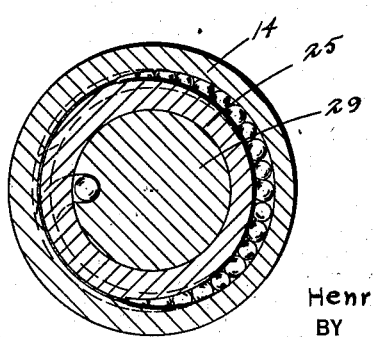
Fig. 4 is a vertical sectional view taken substantially on line 4—4 of Fig. 2.

Referring to Figs. 2, 3 and 4 for a more detailed illustration of the anti-friction screw device, it will be noted that the rotating screw unit is a relatively short member whose exterior diameter is slightly smaller than the interior diameter of the nut 14. The screw 25 is formed with an exterior helically inclined channel 26 of slightly less than semi-circular cross section, such screw unit channel forming with the channel 15 in the nut 14 a helical ball-accommodating duct or orbit for the balls 27 and 28, which interconnect the screw unit and the nut. As in my patent, it is proposed to use alternate large and small balls 27 and 28 respectively, instead of the balls being all of the same size.

The screw 25 is formed as a sleeve having a cylindrical bore into which is fitted a rod 29, said rod being fixedly secured to the sleeve 25 by means of a nut 30 and lock screw 31. An axial ball-accommodating groove 32, which is preferably slightly larger in diameter than the larger balls 27, is formed in the rod 29, each end of said groove being in communication with a drilled aperture 33 formed in each end of the sleeve 25, for affording communication with the sleeve's exterior helical channel. A deflector 34, best shown in Fig. 3 of the drawings, is positioned adjacent each aperture 33 and guides the balls in their travel from the helical channel into the apertures 33 for passage through the groove 32, or out of such groove into the channel. As shown in Fig. 1, the rod 29 is further secured to the screw sleeve 25 by a threaded key 36 which is positioned in advance of the nut 30.

From the above description when taken in connection with the accompanying drawings, it will be readily apparent that rotation of the nut 14 in either direction will cause axial movement of the rod 29 through the interconnection of the screw sleeve 25 and the nut by the balls received in their helical channels. As the nut 14 is rotated relative to the screw 25, the alternate large and small balls 27 and 28, respectively, will travel through the helical ball-accommodating duct formed cooperatively by the nut and screw helical channels, and will be directed in their travel by the deflectors 34 for passage through the groove 32. Thus the circulating balls will interconnect the nut and screw and transmit axial forces from one to the other. From the construction shown in Fig. 1, it will be seen that it is possible to enclose completely the channels of the nut and screw, respectively, as well as the circulating balls and thus retain any lubricant employed for the moving parts. The lower end of the housing 7 is provided with a suitable packing 35 which will aid in retaining the lubricant and at the same time prevent the admission of dirt, dust and other foreign matter.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. An anti-friction screw mechanism comprising a relatively long nut having an internal helical channel, a rod within said nut including a portion of considerably smaller outside diameter than the interior diameter of said nut, said rod portion having therein and extending longitudinally thereof a ball-accommodating groove which is closed at its ends, a sleeve relatively short as compared to said nut and snugly engaged over said rod portion and covering said groove to form thereof a ball by-pass duct, said sleeve having an exterior helical channel complemental to and cooperating with the helical channel of said nut to define between said nut and said sleeve a helical ball-accommodating duct, said sleeve also having two apertures spaced apart longitudinally thereof and extending therethrough and affording communication between said helical ball-accommodating duct and the ends, respectively, of said ball by-pass duct, means securing said rod and said sleeve together as a unit, a series of balls disposed in said ducts whereby relative rotation of said nut and said rod and sleeve unit effects relative longitudinal movement between said nut and said unit, and means to cause said balls to circulate through said ducts in response to relative rotation of said nut and said unit.

2. An anti-friction screw mechanism comprising a rod having therein and extending longitudinally thereof a ball-accommodating groove which is closed at its ends, a sleeve engaged snugly over said rod and covering said groove to form thereof a ball by-pass duct, said sleeve having an exterior helical channel and further having two apertures spaced apart longitudinally thereof and extending therethrough and affording communication between said helical channel and the ends, respectively, of said ball by-pass duct, means securing said rod and said sleeve together as a unit, a member having a helical channel complemental to and cooperating with the helical channel of said sleeve to define between said sleeve and said member a helical ball-accommodating duct, a series of balls disposed in said ducts, those in said helical ball-accommodating duct interconnecting said unit and said member, and means to cause said balls to circulate through said ducts in response to relative rotation of said unit and said member.

HENRY S. HOFFAR.